(No Model.)

E. KNIGHT.
CHUCK.

No. 253,480. Patented Feb. 7, 1882.

Witnesses:
Walter Fowler,
H. T. Harland.

Inventor;
Edgar Knight
By Atty.
J. W. Smith

UNITED STATES PATENT OFFICE.

EDGAR KNIGHT, OF BRIDGEPORT, CONNECTICUT, ASSIGNOR OF TWO-THIRDS TO CHARLES E. SMITH AND OLIVER C. SMITH, OF SAME PLACE.

CHUCK.

SPECIFICATION forming part of Letters Patent No. 253,480, dated February 7, 1882.

Application filed November 2, 1881. (No model.)

*To all whom it may concern:*

Be it known that I, EDGAR KNIGHT, of Bridgeport, Fairfield county, Connecticut, have invented certain new and useful Improvements in Chucks for Drilling-Machines, of which the following is a specification.

My invention relates to that class of devices known as "chucks" for drilling-machines. It has for its object uniformity in its grasp and relax and simplicity in construction; and with these ends in view my invention consists in so shaping and arranging the jaws and the interior of the chuck that a double force is brought to bear on the jaws, as will be hereinafter fully set forth.

In order that those skilled may more fully understand the construction and operation of my improved chuck, I will proceed to describe the same in detail, referring by letter to the accompanying drawings, in which—

Figure 1:
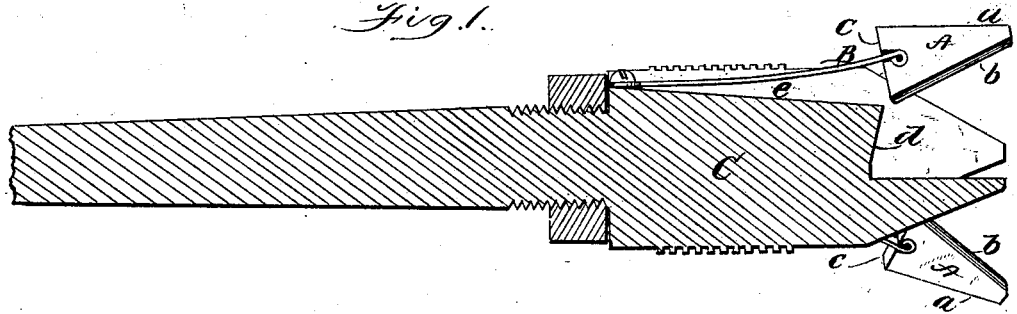
Figure 2:
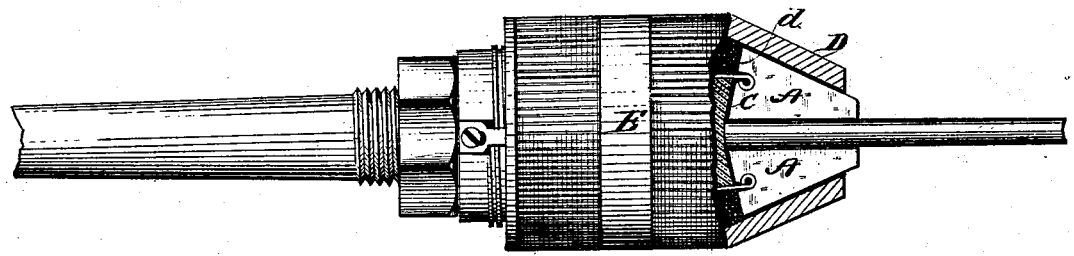
Figure 3:
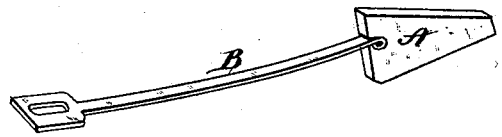

Figure 1 is a longitudinal section taken at one side of the spring and jaw, and showing the positions of the jaws and their relations to the chuck proper, the draw-nut in this view being removed. Fig. 2 is a view in elevation with the nose of the draw-nut broken away, and showing the position of the several parts when the drill is firmly grasped between the jaws. Fig. 3 is a detail view of the jaw and spring connected by toggle-joint, also showing the elongated slot in the spring.

Similar letters denote like parts in the several figures of the drawings.

A are the jaws, which, as seen at Fig. 1, are connected by a toggle-joint or in any suitable manner to a spring, B. This spring is connected to the chuck C by a screw or otherwise, and the slot-opening in the spring is elongated so as to permit of a sliding movement of the same, for the purpose presently explained. The jaws A are of such shape and pitch that when the inclination of the upper surfaces, $a$, coincide with the incline of the nose D of the sleeve or draw-nut E the under or grasping surfaces, $b$, are parallel to each other and to the axis of the chuck itself. The heel ends $c$ of the jaws, when the latter are in the above-mentioned position, are inclined outward toward the nose of the jaws, as will be hereinafter fully explained. The abutment $d$ in the chuck is inclined to a pitch, so as to become parallel to the incline of the jaw-heels $c$ after the sleeve or draw-nut E is placed over them. Elongated channels $e$ are cut in the chuck, and the springs to which the jaws are attached are arranged therein so as not to project above the threaded periphery of the chuck proper.

The operation of my improved chuck is as follows: When the sleeve or draw-nut E is caused to travel backward on the thread its cone or nose D, striking against the upper surfaces, $a$, of the jaws A, forces them into a position parallel to and in contact with the inclined surface of said nose, and at the same time brings the lower surfaces, $b$, of said jaws into a position parallel to each other and to the axis of the chuck. These surfaces $b$, being parallel, will, as the jaws converge by the retrograde movement of the sleeve or draw-nut E, grasp the drill at every point throughout said surfaces, and not merely at a certain point or points. As previously set forth, it will be noticed by reference to Fig. 1 that the rear or heel ends, $c$, of the jaws are inclined outward from the lower surfaces of the latter, and also that the chuck is provided interiorly with abutments or shoulders $d$ inclined inward from the top. Also, when the springs B are forced at their forward ends below the beds of the channels $e$ by the converging of the jaws said springs will buckle or bow upward, which would naturally tend to shorten the distance between the extremities of the same. The sliding movement of the springs, as hereinbefore set forth, relieves the latter from its buckling, and thereby causes the jaws to move backward, for the purpose presently explained. The timing of the buckling movement of the springs and of the converging of the jaws is such that when the former is relieved, as hereinbefore set forth, the inclined heel ends $c$ of the latter are brought against the inclined abutments $d$. As soon as this contact occurs a new force is brought to bear upon the jaws A, and the grasp of the latter is rendered far more firm by reason of there being two forces which tend to press said jaws downward instead of one. Also, a very important feature of this is that by inclining the heel ends $c$ and the abutments $d$, as described, all unnecessary and accordingly detrimental friction is done away with, which would occur if the said heel ends $c$ and abutments $d$ were perpendicular.

It will be readily understood that, since the resiliency of the springs would naturally tend to cause the jaws to diverge, a very slight rotation of the sleeve or draw-nut E in the proper direction—as, for instance, a quarter-turn—would immediately release the drill from the grasp of the jaws, whereas in chucks as made at the present time the arrangement and construction of the jaws are such that in many cases a whole turn of said sleeve or draw-nut is necessary to accomplish this result. The great difficulty experienced with the present chucks lies in the want of power to prevent the drill from slipping or turning within the jaws; also, the complicated nature of such chucks entails great labor and difficulty in cleaning and repairing and renders them exceedingly expensive in cost. My improved chuck, by the simplicity of its construction and the positive and double force brought to bear on the jaws, overcomes all these difficulties, and is cheaper and more durable in every respect.

Having thus described my invention, what I claim as new, and desire to secure by Letters Patent, is—

The jaws A, having their heel-surfaces $c$ inclined in the manner herein described, in combination with the stock C, recessed to receive and form an abutting wall, $d$, for the heel-surfaces $c$ of jaws when they are brought into working position by the sleeve E, substantially as herein set forth.

In testimony whereof I have hereunto set my hand and seal this 28th day of October, A. D. 1881.

EDGAR KNIGHT. [L. S.]

In presence of—
  OLIVER C. SMITH,
  GEORGE F. WILDMAN.